(12) United States Patent
Laird et al.

(10) Patent No.: US 8,903,709 B2
(45) Date of Patent: Dec. 2, 2014

(54) REVISING TRANSLATED DOCUMENTS IN A DOCUMENT STORAGE SYSTEM

(75) Inventors: Michael R. Laird, Leander, TX (US); Travis Renker, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 272 days.

(21) Appl. No.: 13/474,334

(22) Filed: May 17, 2012

(65) Prior Publication Data

US 2013/0311165 A1 Nov. 21, 2013

(51) Int. Cl.
*G06F 17/28* (2006.01)

(52) U.S. Cl.
CPC .................................. *G06F 17/28* (2013.01)
USPC .......................................................... 704/2

(58) Field of Classification Search
CPC ........................................................ G06F 17/28
USPC .............................................. 704/2; 717/137
See application file for complete search history.

(56) References Cited

U.S. PATENT DOCUMENTS

| | | | |
|---|---|---|---|
| 5,222,160 A * | 6/1993 | Sakai et al. ................... | 382/185 |
| 5,987,402 A | 11/1999 | Murata et al. | |
| 7,111,012 B1 * | 9/2006 | Anderson et al. ..................... | 1/1 |
| 7,171,137 B2 * | 1/2007 | Lee et al. ......................... | 399/98 |
| 7,171,618 B2 | 1/2007 | Harrington et al. | |
| 7,295,964 B2 | 11/2007 | Suzuki | |
| 7,369,998 B2 | 5/2008 | Sarich et al. | |
| 7,383,542 B2 | 6/2008 | Richardson et al. | |
| 8,635,539 B2 * | 1/2014 | Young et al. ................... | 715/753 |
| 2004/0186857 A1 | 9/2004 | Serlet et al. | |
| 2010/0223048 A1 | 9/2010 | Lauder | |
| 2011/0022800 A1 | 1/2011 | Porat et al. | |
| 2011/0251867 A1 | 10/2011 | Joshi et al. | |

OTHER PUBLICATIONS

"KCS Operational Model (Knowledge-Centered Support)," Version 3.7, Consortium for Service Innovation, pp. 1-17, www.serviceinnovation.org.
"FileHold Numbering and Versioning," Larry Oliver, pp. 1-5, 2008, http://www.filehold.com/sites/all/files/file-uploads/Numbering_and_Versioning_White_Paper.pdf.

* cited by examiner

*Primary Examiner* — Susan McFadden
(74) *Attorney, Agent, or Firm* — Larson Newman, LLP

(57) ABSTRACT

A method includes creating a first document in a first language and translating the first document into a second language. The translated document is revised directly in the second language. A document storage system stores the three documents and stores data about the three documents.

20 Claims, 6 Drawing Sheets

REVISING TRANSLATED DOCUMENTS IN A DOCUMENT STORAGE SYSTEM

FIELD OF THE DISCLOSURE

This disclosure generally relates to information handling systems, and more particularly relates to revising translated documents in a document storage system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. The information or data processed and stored by information handling system may include the revision of translated documents.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client/server architectures, or middleware server architectures and associated components.

Figure 1:
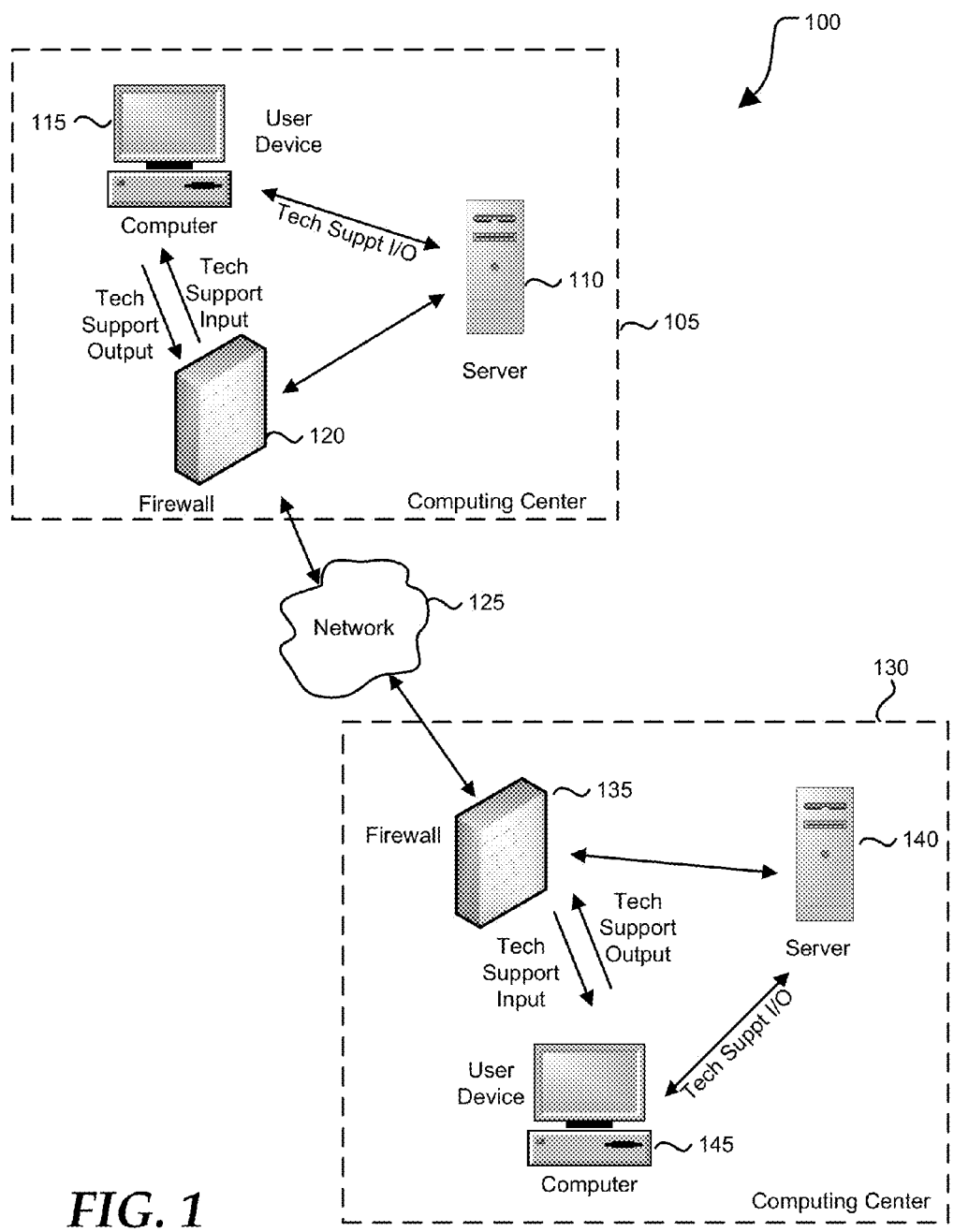
FIG. 1 is a block diagram illustrating a distributed document storage system according to an embodiment of the present disclosure.

FIG. 1 shows a distributed business network system 100 including conventional information handling systems of a type typically found in client/server computing environments capable of revising translated documents in a document storage system in accordance with embodiments of the invention. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Distributed business network system 100 includes computing centers 105 and 130 connected by a communications network 125, such as the Internet or a private network. Computing centers 105 and 130 respectively include conventional user devices 115 and 145 and servers 110 and 140 positioned behind firewalls 120 and 135. In some embodiments, computing centers 105 and 130 may include one or more local area networks (LANS), such as a campus LAN and a management LAN. The user devices 115 and 145 may be desktop personal computers or laptops. The exemplary user devices 115 and 145 may be configured with communications software to enable a user to communicate via communications network 125. The communications software may include conventional web browser software. A web browser, such as Microsoft's Internet Explorer web browser software, allows the user to interact with websites via the network 125. Servers 110 and 140 may include conventional computer hardware and commercially available Enterprise Resource Planning (ERP) and other business process software.

Users at user devices 115 and 145 may be involved in the use, creation, and revising of documents. In some embodiments, the users may be staff at technical support centers. Upon receipt of a technical support request, they may search through a document storage system for solutions to a customer's problem. In some embodiments, users may communicate with customers over network 125 under the protection of firewalls 120 and 135. The technical support requests may, for example, be received over the web, such as by email or through a browser interface. During the course of responding to the request, the users may revise documents or may create new documents that are entered into the document storage system of the business. The users may search for relevant documents in the servers 110 and 140, and may transmit revisions of documents to servers 110 and 140.

The users in computer center 105 may operate in a different language or languages than computer center 130. System 100 may provide for the translation of documents between the two networks. Servers 110 and 140 may, for example, contain applications to translate a document from one language to another. The computer translation of a document from one human language to another human language is known as machine translation. In addition, some of the users may be able to translate the documents of the system. The users may, for example, receive a document from a server, translate the document, and transmit the document back to the server for storage.

Distributed business network system 100 may receive documents from users or from computers and determine which documents to store in the document storage system. Distributed business network system 100 may maintain an association between documents that indicates different versions of documents, different languages of documents, and documents with different statuses. Distributed business network system 100 may also assign priorities and statuses to documents. In some embodiments, some of these activities may be completely automatic and some may be performed by humans. A human may, for example, decide whether to store a document in the document system, determine a priority or status of a document, or translate a document.

Other embodiments of the invention may utilize different computer systems. Some document storage systems may not involve an external network such as network 125. In some embodiments, a user must be physically present at the site of the document system in order to access it. In further embodiments, a single computing center may involve multiple languages. The center may maintain versions of documents in the multiple languages and translate documents among the languages.

In the embodiment of FIG. 1, the same network may be used for communications between computing center 130 and computing center 105 and for communications between users and outside customers. In other embodiments, different networks may be used for the different forms of communications. A user may connect to a customer over one network, such as the Internet, and the two computing centers may be connected by another network, such as a private network. The private network may include a virtual private network or an intranet. Some private networks may be constructed using leased lines between the facilities involved.

Figure 2:
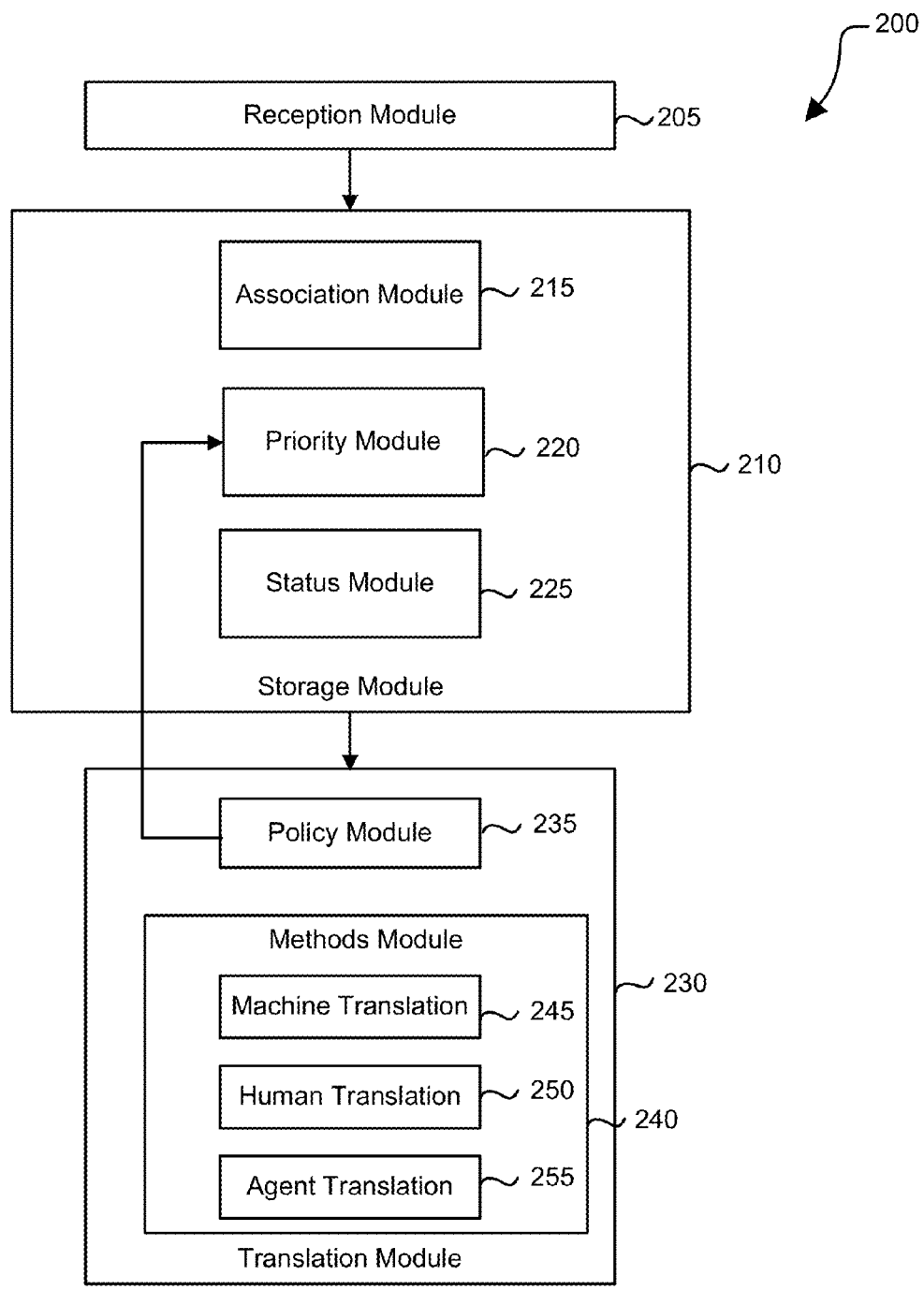
FIG. 2 is a block diagram illustrating a document storage system according to an embodiment of the present disclosure.

FIG. 2 shows a document storage system 200 that includes reception module 205, storage module 210, and translation module 230. Storage module 210 includes association module 215, priority module 220, and status module 225. Translation module 230 includes policy module 235 and methods module 240. Methods module 240 in turn includes machine translation module 245, human translation module 250, and agent translation module 255. Document storage system 200 may provide for revising translated documents. Revising a document may include updating the document on the basis of new information and may include restoring an erroneous version of a document to a previous, correct, version.

The documents managed by document storage system 200 may be created by a user and entered into document storage system 200 through reception module 205. Reception module 205 may determine whether documents submitted to system 200 should be stored in system 200. For example, a user may create a document in response to handling a technical support call and may submit the document to system 200. As another example, a person may translate a document stored in system 200 and submit the translation to system 200. In addition, documents may be created and entered into system 200 automatically. For example, machine translation module 245 may translate a user-created document and enter it into system 200.

In some embodiments, reception module 205 may enter any submitted document into system 200. In other embodiments, reception module 205 may have rules for rejecting documents. Documents may be rejected, for example, if they are incomplete, appear to be in an unsuitable language, or do not appear to cover the appropriate subject matter. In some embodiments, a document may need human review before it is entered into system 200. For example, a committee may review a report of a method for solving a technical problem to determine if the method should be entered into the system. In alternative embodiments, the document may be entered into system 200 before review, but be given a different status after review.

Once reception module 205 determines that a document is suitable for entry into the system, it is stored by storage module 210. Association module 215 determines the relationship, if any, between a newly-entered document and previously stored documents and represents the relationship. One relationship is between a document and a revision. Association module 215 may, for example, assign a revision of a previously stored document the same identifier as the previous document and a different version number. Another relationship is between a document and its translation. Association module 215 may assign to the translation of a document the same identifier and version number, but a different language descriptor.

Priority module 215 determines priorities among versions of a document. An approved revision of a document may, for example, receive higher priority than the original document. In some cases, however, an older version of a document may retain priority. A German document may retain priority as against a more recent translation into German of an English version of the document. The content of the older German document may be considered more valuable than the content of the recent translation. Priority may determine the default document to be displayed. The highest priority document of an associated set of documents may be the default document displayed. A user may, however, be able to display other versions of the document.

Status module 225 determines the status of versions of documents. The status may govern the effect on the document of the receipt of associated documents, such as translations, updates, and other revisions. One aspect of status is priority, discussed above. Another aspect of status controls translations. An article in one language may be designated as a source article. In that case, revisions of the article may be automatically translated into other languages. In some embodiments, document storage system 200 has a predominant language. In many of these embodiments, a version of the document in the predominant language is generally designated the source document. A document in another language may, however, be designated a source document based upon its usefulness. The document may, for example, be useful in solving technical support requests. Designation as a source article may be done by human intervention or automatically. Criteria may include frequency of use. An article used a certain amount of times, or a certain amount of times within a certain time interval, may become a source article. Effectiveness may be another criterion. Effectiveness may include many metrics. In some embodiments, the effectiveness of an article may be rated by the percentage of cases successfully handled by the article. An article with a certain percentage or a higher percentage than other associated articles may be designated as a source article. In other cases, effectiveness may be based upon the ratio of people who view online content, then engage in phone support within five business days for issue resolution to those people who view the content online. This measure of effectiveness may be called Web Failure Rate (WFR). Effectiveness of an article may also be measured by its use causing a reduction of the number of parts that are sent as part of a field service.

A third aspect of priority controls replacement of an article by translations from another language. In the example of the previous paragraph, the revised German document retains priority against translations from a source article. In such a case, the revised German document is designated as self-evolved (SE). An SE article may retain priority against a translation of a revision from another language.

The translation of documents stored in storage module 210 is governed by translation module 230. Policy module 235 provides rules for determining when, by what methods, and into which languages to translate a newly received document. In some embodiments, policy module 235 may also determine priorities among multiple translations of a document from one language to another. Policy module 235 may provide the priorities to priority module 220.

In embodiments with source articles generally in the predominant language, approved revisions of a source article may be translated into other languages. In further embodiments, when an article in another language becomes a source article, it is translated into the predominant language and becomes the source article. Such a system is referred to as an n to 1 system because documents in multiple languages are translated into the predominant language and vice versa. In other systems, translations may be from multiple languages to multiple languages. Such a system is referred to as n to n. In such a system, when the language of a source article changes, the new source article may be translated into multiple languages.

In the embodiment of FIG. 2, policy module 235 also determines which of multiple methods of translations are to be used. In the embodiment of FIG. 2, methods module 240 provides three methods for the translation of a document: machine translation, human translation, and agent translation. Agent translation is translation of a document by a person knowledgeable in the subject matter of the document. The agent may, for example, be a technician fluent in multiple languages and well qualified to translate a document from one to another. Human translation is performed by a person who is not an expert in the subject matter of the document.

Machine translation module 245 may perform machine translation of a document from one language to another. In contrast, human translation module 250 and agent translation module 255 may determine a need for human or agent translation and may notify an administrator to order the translation.

In some embodiments, machine translation may be faster than other methods. A machine translation may be available in a matter of hours, while the other translations may not be available for several days. In these embodiments, policy module 235 may routinely provide for machine translation of a document, once it has been determined that a translation would be useful. Further, policy module 235 may provide for following up the machine translation with another form of translation, either human translation or agent translation. In these embodiments, agent translations may have the highest priority, followed by human translations and then by machine translations.

In some embodiments, translations by other methods may be available. For example, multiple methods of machine translation may be available. In further embodiments, one of the machine translation methods may be selected for translating a document from one language to another. In a few embodiments, multiple methods of machine translation may be used to translate a document from one language to another. In still other embodiments, some of the above methods may not be available. In many embodiments, only one translation may be made of a document from one language to another.

Figure 3:
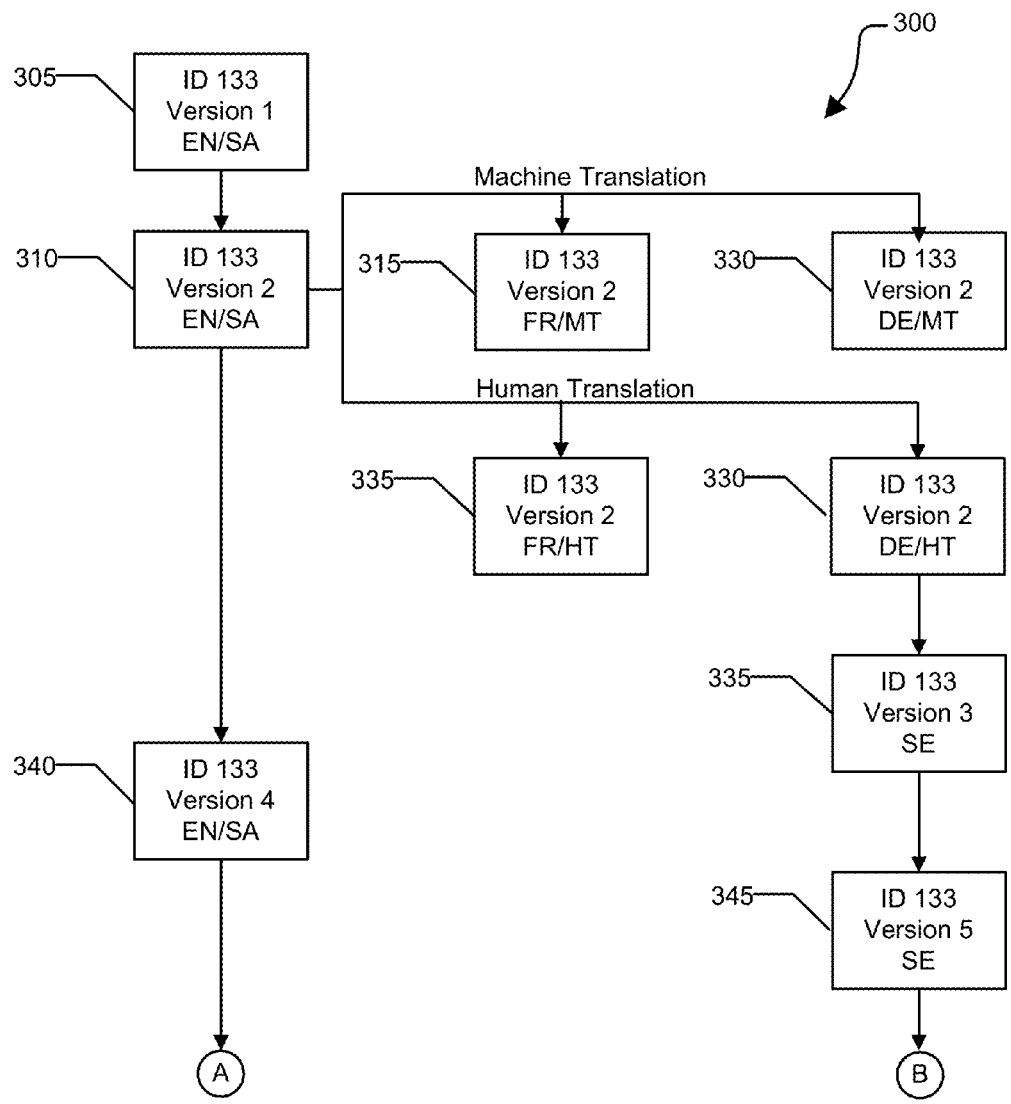
FIG. 3 is a flow diagram illustrating a method according to an embodiment of the present disclosure.
Figure 4:
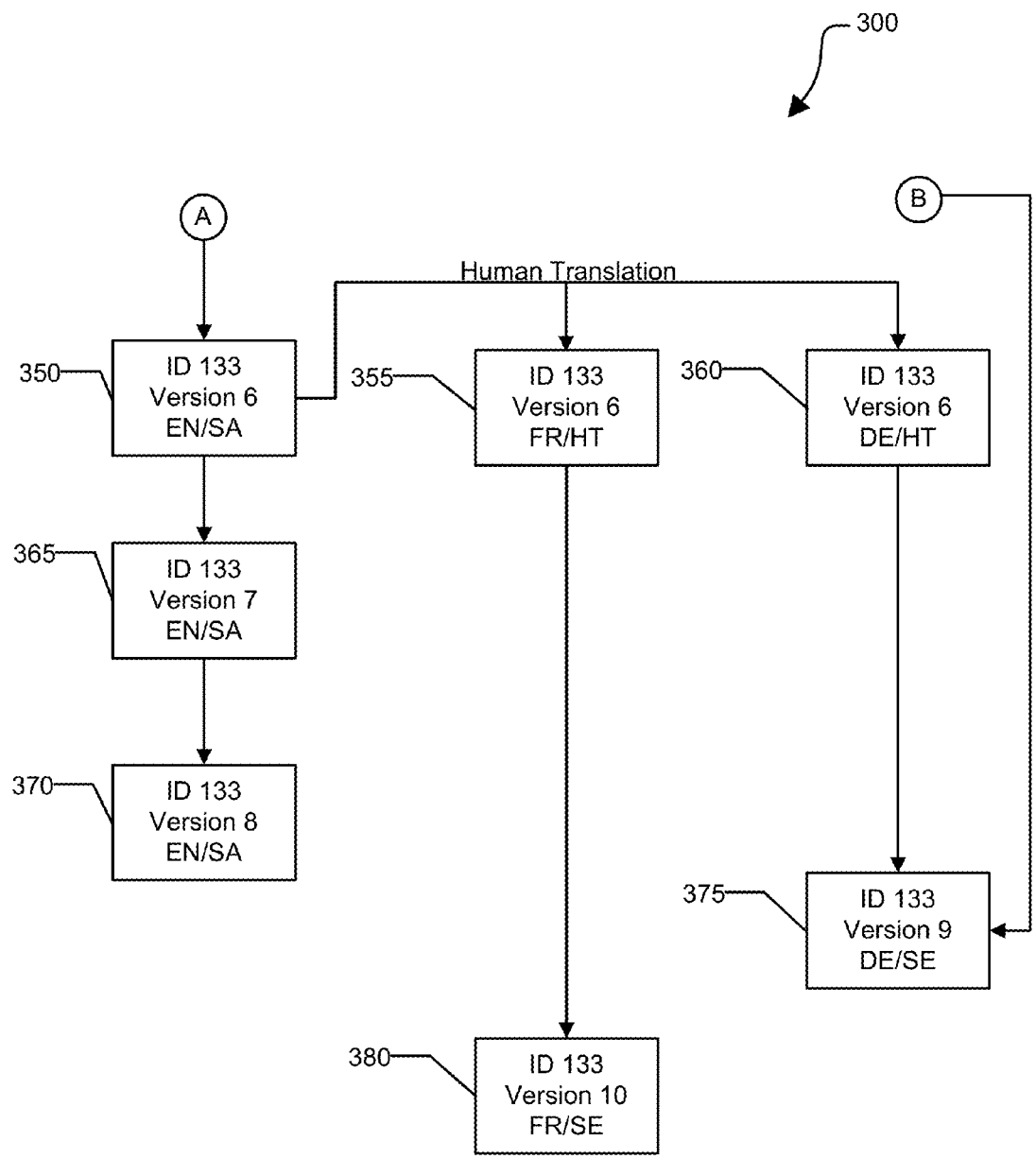
FIG. 4 is a flow diagram illustrating a continuation of the method shown in FIG. 3.

FIGS. 3 and 4 show a flow diagram 300 that begins with an initial article creation at block 305. Article 305 is an English document with identity 123 that is set to version 1 and designated a source article (SA). Because of its designation as a source article, Article 305 may be translated to other languages.

A new English version of the document is created at block 310. Version 2 continues to be a source article. Version 2 is exported to French and German in both machine translation (MT) and human translation (HT) methods as shown at blocks 315, 320, 325, and 330. In the embodiment of FIGS. 3 and 4, all of the translations receive the version number of the source article. In some embodiments, the system may retain both copies of each translation, but may set the visible version to the human translation at blocks 325 and 330 when they are returned.

The German version may be updated and labeled version 3 at block 335. The system may assign this version the status of SE. An SE status of a document may indicate that the document contains useful content separate from the content of a source document, and that the document should not necessarily be superseded by a translation from a source document.

The English copy is modified at block 340 and receives the next version ID (version 4). The English copy continues to be the source article. The German version is also modified at block 345 and receives the next version ID (version 5).

The English version is again updated at block 350 and receives the next version number, version 6. It is then sent for human translation and stored in the system in French and German translations at blocks 355 and 360. Again, in the embodiment of FIGS. 3 and 4, both translations are given the version number of the source article. In some embodiments, when the German version is returned, it is stored in history and version 5 remains in production (by selection of a manager).

The English version is again updated at blocks 365 and 370. In each updating, the version number is increased (versions 7 and 8). The article remains the source article. A new German version (version 9) of the document is generated at block 375. In an embodiment, version 9 is produced by manually merging German version 5 and translated copy (version) 6. The French version is updated at block 380. This version 10 is determined to have useful content and is assigned the status SE.

Figure 5:
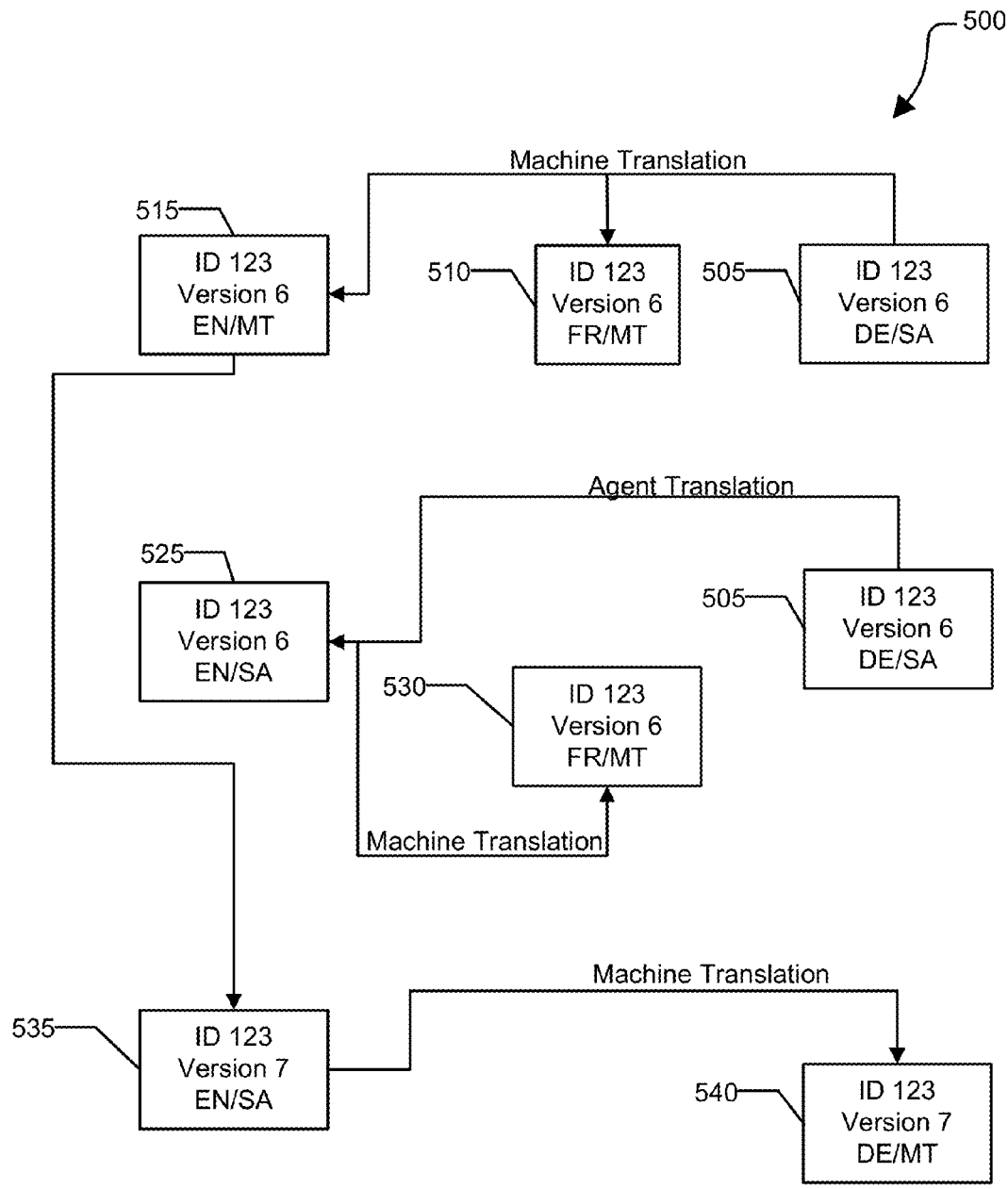
FIG. 5 is a flow diagram illustrating another method according to an embodiment of the present disclosure.

FIG. 5 shows various methods of treating a source article in German represented at block 505. For purposes of FIG. 5, the article is labeled version 6. The treatments may represent separate embodiments of the invention. In one treatment, the source article is machine translated into French and English at blocks 510 and 515. This treatment may represent an n×n translation system, in which translations may occur generally between pairs of languages.

In another treatment, the German source article is translated by an agent into English at block 525. The English version becomes the source version. This version is then machine translated into French at block 530. This portion of FIG. 5 may illustrate an n to 1 translation system, where all or most translations involve a predominant language, in this case English. In this treatment, rather than directly translate the German document into French, it was translated into English and then into French.

English version 6 may be updated at block 535, creating version 7 that is designated a source article. Version 7 is then machine translated into German at block 540. In some embodiments, German article version 7 may supersede German article version 6, and that article may no longer be a source document.

Some embodiments of the methods of FIGS. 3-5 may prove useful for business enterprises that operate in multiple countries and must provide support to their customers in multiple languages. The operations may generate documents in multiple languages to capture the knowledge of the organization. The embodiments may enable the business to maintain links between documents so that updates and other revisions made to a document in one language may be immediately available for use in another language. Some of the business enterprises may, for example, adopt a "follow the sun" methodology of responding to service call requests. A technical support problem may arise in Japan. Documents capturing attempts to solve the problem may be entered into the system in Japanese. Later in the day, if the problem arises in Europe, system users may look to translations of the Japanese documents in an attempt to resolve service calls involving similar problems. These solutions may later be used in the United States. If, at some stage, a better fix for a problem is discovered, the document representing that solution may become the source or authoritative version and may supersede an earlier document written in a different language.

In particular, some of these business enterprises may operate under a Knowledge Centered Support (KCS) environment. The KCS environment is a highly dynamic and collaborative method for capturing knowledge for use in solving problems, such as responding to customer service requests. In the KCS methodology, knowledge is entered into the system in response to interactions with customers. There are four steps in the process capture in the workflow—structure for reuse, searching is creating, and just-in-time solution quality.

In the first two steps, knowledge is entered into the system in the course of solving a problem. The knowledge should separate out the issue faced and the solution. The issue should be described in terms used by the customer in order to make the document easier to find in response to a service call from another customer.

In the third step, the knowledge about the search process may be used to augment the database. A technician who finds a solution to a problem in the knowledge base may revise the document to reflect the search terms used in an attempt to retrieve the document. If no document is found, the issue may be submitted to the support organization. Once a resolution is found, it may be added to the knowledge base.

In the fourth step, technicians utilizing documents in the course of solving problems are obligated to monitor the documents they review. Someone finding an error or a better solution may modify the previous document or flag it for review by someone with authority to modify documents. Similarly, someone finding a new solution, either to a new or known problem, should enter the solution into the system.

In a business enterprise operating in multiple languages under a KCS system, embodiments of the methods of FIGS. 3-5 may prove useful in ensuring that knowledge of the business for solving a problem, captured in any language, is quickly available to technicians dealing with the problem in other languages. In particular, the embodiments may protect useful knowledge contained in a document in one language from being lost when the document is superseded by a translation of a document from another language.

Further, the embodiments may prove useful for organizations, such as business organizations, that translate a document from one language to another utilizing multiple methods. The multiple methods may be useful because of the different turn-around time of the various methods and the different reliability. For such organizations, embodiments of the methods of FIGS. 3-5 may prove useful in generating translations of documents by multiple translations methods and by providing easy access to the translation of a document most useful to the organization.

Figure 6:
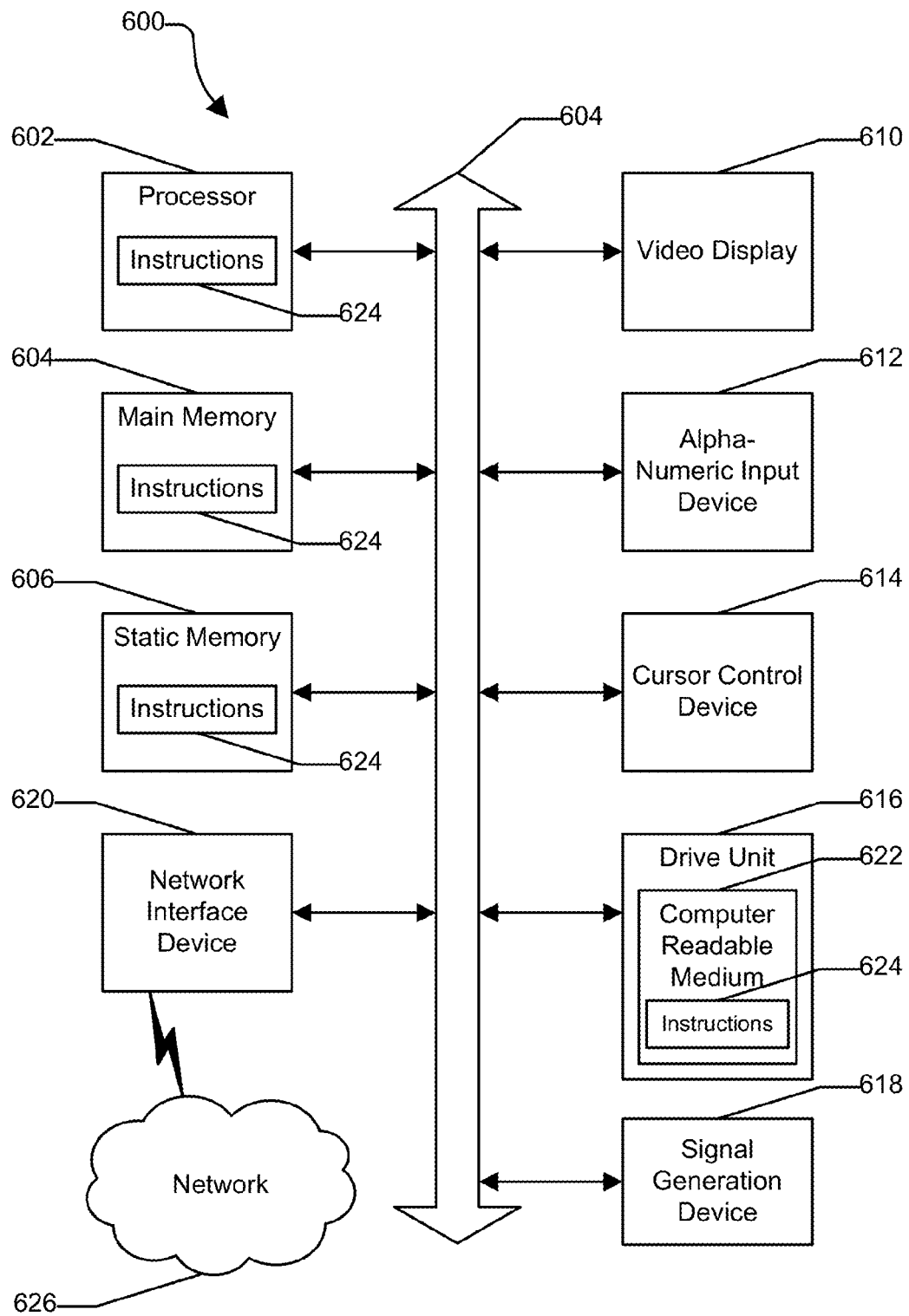
FIG. 6 is a block diagram of an information handling system according to an embodiment of the present disclosure.

FIG. 6 shows an information handling system 600 capable of administering each of the specific embodiments of the present disclosure. The information handling system 600 can represent the user devices 115 and 145 or the servers 110 and 140 of FIG. 1 or another data processing device associated with the business network system 100.

The information handling system 600 may include a processor 602 such as a central processing unit (CPU), a graphics processing unit (GPU), or both. Moreover, the information handling system 600 can include a main memory 604 and a static memory 606 that can communicate with each other via a bus 608. As shown, the information handling system 600 may further include a video display unit 610, such as a liquid crystal display (LCD), an organic light emitting diode (OLED), a flat panel display, a solid state display, or a cathode ray tube (CRT). Additionally, the information handling system 600 may include an input device 612, such as a keyboard, and a cursor control device 614, such as a mouse. The information handling system 600 can also include a disk drive unit 616, a signal generation device 618, such as a speaker or remote control, and a network interface device 620. The information handling system 600 can represent a server device whose resources can be shared by multiple client devices, or it can represent an individual client device, such as a desktop personal computer.

The information handling system 600 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The disk drive unit 616 may include a computer-readable medium 622 in which one or more sets of instructions 624 such as software can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the information handling system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal; so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure.

For example, many of the embodiments described above involve document storage systems that provide for managing revisions of translated documents. In other embodiments, document systems may manage other kinds of transformations from one document to another. An organization may, for example, be divided into components, such as divisions, locations, or branches. Documents for use in one component may be modified in order to be used in another. One example might be customization. An organization may, for example, sell a product to business users and to home users. A basic model may be customized to support business use. In that case, documents describing the basic model may be customized to describe a business model. Another example is a business with various divisions for particular customers. A product made for sale by a particular retailer might, for example, include a decal or logo of the retailer. Again, a document containing a solution to a technical support problem for one retailer might be modified to provide a solution to a technical support problem for another retailer.

As another example, a document transformation may include a localization. A political party may, for example, have a procedure for transforming a general voter appeal to an appeal for Texas voters. In embodiments of this invention, the political party could revise the transformed voter appeal and store that revision in its document system. Because that revised document may have national use, the system may have a procedure for making the document available system-wide.

In maintaining such document systems, problems might arise similar to the problems described above with respect to translations and revisions. It may be useful for the document system to manage the transformations and other revisions. Solutions may involve methods similar to those described above.

In addition, the discussion of the above embodiments describes translations in terms of entire documents. In some embodiments, a translation may involve only a portion of a document. Similarly, in customization or other transformations, only a portion of the document may be customized. If, for example, products for a particular retailer are differentiated by a few features, then a document describing many features may need only a few changes to transform a document for use in dealing with one retailer into a document for use in dealing with another retailer.

Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   creating a first document in a first language;
   translating the first document into a second language, thereby producing a second document;

revising the first document, comprising updating the first document as a result of processing a first service call;
revising the second document directly in the second language, thereby producing a third document; and
maintaining by an information handling system a document storage system, the maintaining including:
  storing the first, second and third documents; and
  storing in a computer memory data representing that the third document is a revision of a translation of the first document and that the second document is a translation of the first document, wherein:
    the document storage system comprises a Knowledge Centered Support (KCS) document storage system; and
    the revising the second document directly in the second language comprises revising the second document directly in the second language as a result of processing a second service call, wherein parties to the second service call communicate in the second language.

2. The method of claim 1 further comprising:
designating a document in the first language of the document storage system a source document;
translating the source document into a second language, thereby producing a first translated document;
revising the source document, the revised document remaining a source document in the first language;
automatically translating the revised source document into the second language in response to the revising, thereby producing a second translated document; and
automatically superseding by the document storage system the first translated document by the second translated document based upon the revised source document remaining a source document and based upon the translating.

3. The method of claim 1 further comprising:
translating the revising of the first document into the second language; and
storing a notice to merge the translation of the revised first document and the third document.

4. The method of claim 1 further comprising translating the first document into the second language by a second method of translation, thereby producing a fourth document.

5. The method of claim 4 further comprising assigning a priority to the fourth document over the second document, the priority based upon the two translation methods.

6. The method of claim 5 wherein:
the method further comprises translating the first document into the second language by a third method of translation;
the first method of translation comprises machine translation (MT);
the second method of translation comprises human translation by a human not well-versed in subject matter of the first document (HT);
the third method of translation comprises human translation by a human well-versed in subject matter of the first document (AT); and
the priority ordering gives higher priority to AT than to HT or MT and higher priority to HT than to MT.

7. The method of claim 1 further comprising:
determining that the third document contains useful content not otherwise contained in the document storage system (is an SE document);
designating the first document as a source document;
updating the first document, thereby producing an updated first document;
automatically translating the updated first document into the second language in response to the updating, thereby producing a fourth document; and
not superseding the third document with the fourth document, based upon the determination that the third document is an SE document.

8. The method of claim 7 further comprising designating the third document as a source document.

9. The method of claim 8 further comprising:
translating the third document into a third language; and
automatically superseding a document in the third language with the translated third document.

10. The method of claim 8 further comprising:
translating the third document into the first language;
designating the translated third document in the first language as a source document; and
removing the designation of the third document in the second language as a source document.

11. The method of claim 8 wherein the designating comprises automatically designating the third document as a source document based upon a policy.

12. The method of claim 11 wherein the designating comprises automatically designating the third document as a source document based upon frequency of use.

13. The method of claim 11 wherein the designating comprises automatically designating the third document as a source document based upon effectiveness.

14. The method of claim 13 wherein:
the third document contains information on dealing with a technical support issue; and
the designating based upon effectiveness comprises designating the third document as a source document based upon one or more of the following criteria:
  a ratio of service calls on the technical support issue successfully handled based upon the third document to total service calls on the technical support issue attempted to be handled based upon the third document;
  a reduction in a number of parts sent as part of a field service as a result of service calls on the technical support issue handled by the third document; and
  a ratio of:
    people who view content of the third document online and then engage in phone support within a fixed number of business days for issue resolution to total people who view content of the third document online.

15. The method of claim 8 further comprising:
updating the updated first document, thereby producing a twice-updated first document;
automatically translating the twice-updated first document into the second language, thereby producing a fifth document; and
merging the third document with the fifth document.

16. A non-transitory computer-readable medium comprising a plurality of instructions, the instructions comprising:
instructions to create a first document in a first language;
instructions to translate the first document into a second language, thereby producing a second document;
instructions to revise the second document directly in the second language, thereby producing a third document;
instructions to translate a revising of the first document into the second language;
instructions to store a notice to merge the translation of the revised first document and the third document; and
instructions to maintain a document storage system, including:

storing the first, second and third documents; and storing data representing that the second document is a translation of the first document, that the third document is a revision of the second document, and that the third document is a revision of a translation of the first document.

17. The non-transitory computer-readable medium of claim 16 wherein the instructions further comprise:

instructions to designate a document in the first language of the document storage system a source document;

instructions to translate the source document into a second language, thereby producing a first translated document;

instructions to revise the source document, the revised document remaining a source document in the first language;

instructions to translate the revised source document into the second language in response to the revising, thereby producing a second translated document; and instructions to supersede by the document storage system the first translated document by the second translated document based upon the revised source document remaining a source document and based upon the translating.

18. A method comprising:

translating documents from a first language into a second language by a plurality of methods of translation, wherein:

the translated documents are child documents; and the translating produces multiple child documents for each document of a subset of the documents, the documents of the subset of documents in the first language;

assigning priorities to the multiple child documents of each document of the subset of the documents based upon the methods of translation; and maintaining by an information handling system a document storage system, the maintaining including:

storing the documents from the first language;

storing the child documents;

storing data representing that the child documents are translations of the documents from the first language; and storing data representing the assigned priorities of the multiple child documents for each document of the subset of the documents.

19. The method of claim 18 wherein:

the plurality of methods comprises:

machine translation (MT);

human translation by a human not well-versed in a subject matter of the document (HT); and human translation by a human well-versed in a subject matter of the document (AT); and the automatically assigning priorities comprises:

assigning AT translations priority over HT translations and MT translations; and assigning HT translations priority over MT translations.

20. The method of claim 18 further comprising:

setting a default display of a child document of a document of the document storage system to a translated document with a highest priority; and retaining all translations of the document of the document storage system.

\* \* \* \* \*